United States Patent
Boll et al.

(10) Patent No.: US 6,679,810 B1
(45) Date of Patent: Jan. 20, 2004

(54) HILL HOLDER DEVICE FOR A MOTOR VEHICLE

(75) Inventors: Bernhard Boll, Wellesbourne (GB); Jochen Stinus, Inzlingen (DE); Michael Salecker, Stuttgart/Sonnenberg (DE); Georg Schneider, Bühl (DE)

(73) Assignee: Luk Lamellen und Kupplungsbau Beteiligungs KG, Bühl (DE)

(*) Notice: Subject to any disclaimer, the term of this patent is extended or adjusted under 35 U.S.C. 154(b) by 0 days.

(21) Appl. No.: 09/807,486

(22) PCT Filed: Oct. 13, 1999

(86) PCT No.: PCT/DE99/03332

§ 371 (c)(1),
(2), (4) Date: Aug. 16, 2001

(87) PCT Pub. No.: WO00/21812

PCT Pub. Date: Apr. 20, 2000

(30) Foreign Application Priority Data

Oct. 14, 1998 (DE) .......................... 198 47 243

(51) Int. Cl.$^7$ .................................................. B60K 41/20
(52) U.S. Cl. .................... 477/195; 477/194; 477/191
(58) Field of Search ................... 477/194, 195, 477/196, 197, 198, 199; 303/191

(56) References Cited

U.S. PATENT DOCUMENTS

| 3,645,352 | A | * | 2/1972 | Stark et al. ............... 180/271 |
|---|---|---|---|---|
| 4,681,196 | A | * | 7/1987 | Fulmer et al. ............. 477/198 |
| 4,717,207 | A | * | 1/1988 | Kubota et al. ............... 303/3 |
| 4,865,175 | A | * | 9/1989 | Hirako et al. ............. 477/186 |
| 5,223,760 | A | * | 6/1993 | Peck et al. ............... 310/168 |
| 5,415,467 | A |   | 5/1995 | Utz et al. ................. 303/89 |
| 5,452,946 | A | * | 9/1995 | Warner .................. 303/24.1 |
| 5,920,193 | A | * | 7/1999 | Tola et al. ............... 324/173 |
| 5,984,429 | A | * | 11/1999 | Nell et al. .............. 303/113.4 |
| 6,009,984 | A | * | 1/2000 | Zechmann et al. ......... 188/353 |
| 6,086,515 | A | * | 7/2000 | Buschmann et al. ....... 477/194 |
| 6,256,568 | B1 | * | 7/2001 | Siepker et al. ............ 313/310 |
| 6,260,934 | B1 | * | 7/2001 | Lee ......................... 303/192 |
| 6,286,617 | B1 | * | 9/2001 | DeLuca et al. ............ 180/275 |
| 6,287,236 | B1 | * | 9/2001 | Ishikawa .................. 477/71 |
| 6,315,372 | B1 | * | 11/2001 | Kroger et al. ............ 303/191 |
| 6,401,899 | B1 | * | 6/2002 | Kanehisa et al. ........ 192/219.5 |

FOREIGN PATENT DOCUMENTS

DE     196 30 870 A 1     2/1998

* cited by examiner

Primary Examiner—Jack Lavinder
Assistant Examiner—Benjamin Pezzlo
(74) Attorney, Agent, or Firm—Alfred J. Mangels

(57) ABSTRACT

The invention relates to a motor vehicle comprising at least one device for preventing unintentional movements.

92 Claims, 4 Drawing Sheets

HILL HOLDER DEVICE FOR A MOTOR VEHICLE

BACKGROUND OF THE INVENTION

1. Field of the Invention

The present invention relates to a motor vehicle as well as to a method for operating a motor vehicle.

2. Description of the Related Art

A method for operating a motor vehicle in a particular way, namely a method to assist a motor vehicle starting operation, is already known from DE 196 30 870 A1.

DE 196 30 870 A1 proposes to assist a starting operation of a motor vehicle having an automatic transmission and that is secured in a rest condition by brake engagement through an external force, to subsequently detect a torque produced by a drive motor. As soon as the torque exceeds a threshold value, brake engagement is released according to the known method.

That known arrangement is suitable for assisting motor vehicle starting operation in certain driving situations.

Of course, certain improvements with regard to flexibility as well as assembly possibilities of such an arrangement are desirable.

The object of the present invention is to provide a motor vehicle that prevents unintentional rolling away in given conditions, and that at the same time is economical as well as structurally simple to manufacture and that is additionally very versatile.

SUMMARY OF THE INVENTION

In accordance with the invention there is consequently provided a motor vehicle that has an electronically-controlled clutch apparatus and/or that has an automated shift transmission and that is provided with a hill holder apparatus.

The hill holder apparatus prevents undesired movement of the motor vehicle primarily under predetermined conditions, that is, at predetermined times or in predetermined situations.

The terms "undesired motion" as well as "brake effect" are in the sense of the invention to be understood to be broadly construed. The term "brake effect" applies, for example, according to intention, to a parking brake system and to parking brake system operation and/or a service brake and to service brake operation. Likewise, any type of delayed engagement of starting movement can be understood by that term.

It should be noted that, in the sense of the invention, at least indirect should be understood particularly to be direct and/or indirect.

The motor vehicle has a drive system such as, for example, an engine. Preferably the engine is an internal combustion engine. The motor vehicle is further provided with a driven system. The driven system includes for example at least one axle and at least two wheels. Preferably the driven system includes four wheels.

The motor vehicle in accordance with the invention further includes a torque transmitting apparatus such as a clutch, as well as a transmission unit.

The transmission unit is disposed between the drive system and the driven system. Preferably, the torque transmitting apparatus is disposed between the transmission unit and the drive system. Especially preferred is the disposition of the transmission unit between the drive system and the torque transmitting apparatus.

The invention is in that respect advantageous in that for motor vehicles with electronically-controlled clutch arrangements (designated by the applicant as electronic clutch management EKM) as well as ASG motor vehicles, undesired rolling away of the motor vehicle is prevented in a secure and reliable type and way. Those situations of undesired rolling away can occur, for example, on a hill. Accordingly, a hill holder arrangement makes possible during starting, for example, retention of a motor vehicle immediately before, as well as during, the starting process. But a hill holder apparatus in accordance with the invention also makes possible the prevention of undesired motor vehicle movement beyond one of such starting processes. Further, the invention is advantageous to the extent that it can be very flexibly matched with specific motor vehicles having ASG, as well as electronically controlled clutch arrangements.

In accordance with an especially preferred embodiment of the invention undesired movements of a motor vehicle are terminated as well as prevented by the hill holder apparatus.

It is also preferred that the hill holder apparatus terminates as well as prevents rolling away on a hill.

In accordance with an especially preferred embodiment of the invention, a braking as well as a parking operation can be performed on the vehicle by the hill holder apparatus at predetermined times and/or in predetermined situations.

Preferably further, the hill holder produces direct and/or indirect coupling in the manner of a clutch between at least a portion of the drive system and at least a portion of the driven system. The clutch is, for example, designed in such a manner that components that are movable with respect to each other during vehicle rolling motion are firmly coupled to each other. For example, the invention provides that a component mounted in the torque flow between the drive system and the driven system is at least temporarily rigidly affixed in place relative to the vehicle body.

It is further preferred that the drive system and/or the driven system are at least partly firmly affixed relative to the vehicle body, whereby the drive system again is firmly coupled to the driven system.

According to an especially preferred embodiment of the invention, the hill holder apparatus engages essentially independently of the service brake in a vehicle movement situation.

It is further especially preferred that the hill holder apparatus controls the vehicle motion status at least in part and/or at least temporarily as a function of at least one vehicle condition parameter. Such a vehicle condition parameter for instance is its speed or the clutch temperature or a rotational speed, such as engine rpm or the transmission rotational speed. It is also preferred that the movement condition of the motor vehicle is controlled at least partly as a function of its driving condition. For example, one such driving condition is "creeping" or "starting" or "driving" or "neutral" or "park."

It is further preferred that the hill holder apparatus is at least in part designed as a locking system or has at least part of a locking system.

In accordance with another especially preferred embodiment of the invention, the hill holder apparatus is at least partly mechanical, or engages at least partly an at least partly mechanical component. Especially preferred is a clutch based at least in part on mechanical principles, which is controlled by the hill holder apparatus.

Especially preferred, further, the hill holder apparatus has at least a portion of a mechanical locking system or represents a part of a mechanical locking system. A locking system based on other principles also is preferred in accordance with the invention.

An especially preferred motor vehicle has a hill holder apparatus with at least one free-wheeling component. The free-wheeling component is mounted, for example, near the transmission. For example, the operation of such a free-wheeling component can be controlled as a function of rotational speed. Preferably, one direction of rotation is blocked in some ranges of rotational speeds. Preferably further, the free-wheeling component operates in such manner that under certain situations one direction of rotation is blocked. For example, the hill holder apparatus is designed with a free-wheeling component in such a manner that whenever the accelerator pedal is not operated, the free-wheeling component is switched to prevent vehicle backward movement. It is further preferred that at least one free-wheeling component is associated with the individual transmission gear ratios.

In accordance with an especially preferred embodiment of the invention, the hill holder apparatus is at least partly electrical. It is further preferred that the hill holder apparatus has at least a portion of an electrical locking system.

Especially preferred, the hill holder apparatus is at least partly magnetic. Also preferred is an at least partly electromagnetic hill holder apparatus.

In accordance with an especially preferred embodiment of the invention, the hill holder apparatus is at least partly hydraulic. It is also preferred that the hill holder apparatus is at least partly hydraulically driven. An especially preferred embodiment of a motor vehicle in accordance with the invention equipped with a hill holder apparatus has a connection possibility at least partially enclosed by the hill holder apparatus, over which at least temporarily a positive locking connection is produced to prevent as well as to limit motor vehicle movement. It is also preferred that a positive locking connection over the hill holder apparatus is at least temporarily releasable In an especially preferred embodiment of a motor vehicle in accordance with the invention with a hill holder apparatus, the hill holder apparatus is designed in such a manner that by means of it at least partially and/or at least temporarily a substantially positive-locking connection is produced and/or is releasable. It is also preferred that at least partially and for at least temporarily a frictional connection is produced by the hill holder apparatus and/or is releasable.

In an especially preferred motor vehicle in accordance with the invention the positive and/or frictional connection set up by the hill holder apparatus is arranged at least partly in the torque path between the drive system and the driven system.

It is further preferred that the clutch or the clutch operation is affected or controlled at least in part by the hill holder apparatus. In an especially preferred manner the clutch actuation apparatus is at least partly actuated or affected or controlled by the hill holder apparatus.

In an especially preferred embodiment of the invention, the vehicle motion may be affected or prevented by engaging an electronically controlled clutch such as the applicant's marketed electronic clutch management (EKM) device.

In this respect and in an especially preferred manner, the hill holder apparatus engages an electronically controlled clutch to suppress motor vehicle rolling. For instance, under predetermined conditions the hill holder apparatus will transmit a signal to the clutch actuation apparatus, whereby the clutch closes at least partly. Preferably in this respect, the clutch closes enough to prevent it from slipping. Preferably also in this respect, the clutch closes to such an extent that a predefined slippage or slippage torque occurs or can occur at the clutch.

In an illustrative manner, the invention provides that when the engine is substantially shut off, the clutch closes at least partly.

It is also preferred that the hill holder apparatus directly and/or indirectly engages at least partly an automatic transmission (ASG) to prevent the motor vehicle from being set in motion or to affect or prevent or reduce motor vehicle motion.

In an especially preferred manner the hill holder apparatus engages at least partly the brake apparatus, such as the service and/or parking brake of the motor vehicle. In an especially preferred manner, the brake apparatus is at least partly automated.

It is further preferred that the hill holder apparatus is enclosed at least partly by the brake actuation apparatus. It is also preferred that the hill holder apparatus is coupled at least partly and/or at least temporarily with the brake apparatus and/or the brake actuation apparatus.

An especially preferred motor vehicle in accordance with the invention with a hill holder apparatus has a direction-of-rolling detector to determine the rolling direction of the motor vehicle and/or to determine a change in the rolling direction of the motor vehicle.

In an especially preferred manner, the motor vehicle in accordance with the invention has a device for producing a signal that activates the hill holder apparatus. It is further preferred that the motor vehicle in accordance with the invention has an apparatus which at predetermined times will produce a signal to again deactivate the hill holder apparatus.

It is further preferred that the hill holder apparatus is, activated under predetermined conditions and is deactivated under predetermined conditions.

In accordance with an especially preferred embodiment of the invention, the hill holder apparatus is activated in such manner that a gear selector switch assumes a predetermined position and/or is put back in a predetermined way.

In another preferred embodiment, the hill holder apparatus is activated when the transmission shift selector assumes the state "park." Preferably, furthermore, the hill holder apparatus is activated when the transmission shift selector assumes the state "park" and the motor vehicle speed is less than a predetermined limit speed.

In an especially preferred manner, the hill holder apparatus is activated and/or deactivated as a function of motor vehicle speed and/or the acceleration of the motor vehicle.

In accordance with an especially preferred embodiment of the invention, the hill holder apparatus is activated or deactivated by the movement and/or driving condition of the motor vehicle.

It is also preferred that the hill holder apparatus is activated as needed depending on the direction of rotation of at least one motor vehicle axle and/or at least one of its wheels. Preferably, the hill holder apparatus can be activated or deactivated for instance as a function of the rotational speed of a drive wheel or of a drive axle of the motor vehicle. Preferably also, the hill holder apparatus can be activated and/or deactivated as a function of rotational speed and/or movement direction and/or change in rotational speed of at least one driven wheel or one driven axle of the motor vehicle.

Preferably, further, the hill holder apparatus can be activated and/or deactivated as a function of a change in direction of rotation of an axle, such as a driving or a driven axle.

In accordance with an especially preferred embodiment of the invention the hill holder apparatus can be activated and/or deactivated at least partly depending on at least one signal from at least one sensor. Preferably, the hill holder apparatus is activated and/or deactivated as a function of a signal from a wheel rotation sensor and/or an engine speed sensor.

In an especially preferred embodiment of the invention, the hill holder apparatus is activated and/or deactivated at least in part as a function of the speed and/or the acceleration and/or the change in acceleration of the motor vehicle.

Preferably also, the hill holder apparatus is activated and/or deactivated at least in part as a function of the position of an ignition key and/or an ignition mechanism and/or as a function of a change in the position of an ignition key and/or an ignition mechanism.

Illustratively, the hill holder apparatus is activated when the vehicle speed following removal of the ignition key drops below a predetermined limit speed.

In accordance with an especially preferred embodiment of the invention, the hill holder apparatus is activated and/or deactivated at least in part as a function of a measured or calculated temperature. For example, the hill holder apparatus is activated and/or deactivated as a function of the clutch temperature.

It is also preferred that the hill holder apparatus is activated and/or deactivated as a function of a distance covered by the motor vehicle and/or of a predetermined rotational speed of at least one tire. Preferably also, the hill holder apparatus is activated and/or deactivated as a function of a predetermined time interval.

For example, the hill holder apparatus is activated when the motor vehicle is for instance in the mode "start" or "creep" longer than a predetermined pause period It is especially preferred that the predetermined time interval begins upon a predetermined event and/or at a predetermined time.

Preferably also, the hill holder apparatus is inactivated at predetermined times and/or under predetermined conditions.

Preferably, further, the hill holder apparatus is inactivated as a function of clutch-engagement intensity. Preferably, further, the hill holder apparatus is inactivated as a function of predetermined conditions of the electronically controlled clutch and/or the ASG.

In accordance with an especially preferred embodiment of the invention, the hill holder apparatus is inactivated based on the course of the reference slope of a reference component of the clutch.

Preferably also, the hill holder apparatus can be inactivated as a function of the position and/or the time progress of the position of a fuel-measuring member such as the accelerator pedal.

In accordance with a preferred embodiment of the invention, the hill holder apparatus can be inactivated based on the vehicle's driving conditions.

Preferably also, the hill holder apparatus can be inactivated based on predetermined motor vehicle condition parameters or their magnitude or their change over time.

In accordance with an especially preferred embodiment of the invention, the hill holder apparatus can be inactivated as a function of predetermined shifting procedures and/or shift paths and/or shift positions of the transmission shift lever.

Preferably further, the hill holder apparatus can be activated and/or deactivated or inactivated as a function of power loss, for instance the power loss at the clutch.

In accordance with the invention there is also provided a method for driving a motor vehicle equipped with an electronically controlled clutch and/or an automatic transmission (ASG), that, under predetermined conditions, the motor vehicle [shall] is prevented from being set in motion and/or rolling away. It is further preferred that under predetermined conditions wherein motor vehicle motion is unwanted, the motor vehicle is stopped automatically, i.e., in an automated manner.

In accordance with an especially preferred embodiment of the invention, a check is first carried out whether the transmission shift selector is in "park." As long as that condition is met, the next check is whether the vehicle speed is less than a predetermined speed. Preferably also, the vehicle speed is checked for being within a predetermined speed interval. Especially preferred also is that parameters related to driving speed are checked to determine whether they are within a predetermined range and/or larger and/or smaller than a predetermined limit value.

So long as the motor vehicle speed is less than the predetermined limit speed, then the above conditions or supplemental ones will apply and braking or stopping the vehicle will then be initiated. Preferably also, a hill holder apparatus is activated.

In accordance with an especially preferred embodiment of the invention, a check is first carried out whether the vehicle is in a start mode. If that is the case, a next check is made to ascertain whether the vehicle speed is less than a predetermined limit speed. Alternatively and/or additionally, the above checks can also be carried out. Provided the vehicle speed is less than the predetermined limit speed, i.e., that the other conditions be met additionally or equivalently, a check is carried out whether the vehicle is in the start mode longer than a predetermined limit period and/or at less than the predetermined limit speed value.

Preferably also, a check is carried out, i.e., in complementing manner, whether the above conditions, such as whether vehicle speed is within a predetermined interval, are fulfilled.

The above limit period can be, for example, 60 seconds or 50 seconds or 40 seconds or 30 seconds or 20 seconds or 15 seconds or 10 seconds or 8 seconds or 6 seconds or 4 seconds or 2 seconds or 1 second.

If the vehicle remains in a given condition longer than the predetermined time interval, the hill holder apparatus will subsequently be activated, i.e., the motor vehicle is transferred into a given movement condition. This movement condition is especially a movement condition in which the motor vehicle is substantially at rest. Preferably also, the motor vehicle is transferred into a movement condition in which the speed of the motor vehicle is less than a predetermined second speed.

The predetermined condition is determined, for example, or in particular, by the vehicle being in a start mode and/or the speed of the motor vehicle being less than the predetermined (first) speed.

In accordance with an especially preferred embodiment of the invention, the first check is whether the vehicle is in a start mode.

If that is the case, whether the vehicle is rolling back is subsequently checked. That can be determined, for example, by means of the direction of rotation of at least one vehicle axle and/or at least one motor vehicle tire and/or at least one component of the transmission. It should be noted in this respect that the invention includes a number of further possibilities. As long as the vehicle is rolling backward, whether motor vehicle speed is greater than a predetermined limit speed is subsequently checked.

So long as the motor vehicle speed is greater than the limit speed, the hill holder apparatus will be activated, i.e., the vehicle will be forced into a substantially movement-free condition.

It should be noted that here instead of sensing speed or limit speeds, parameters such as the rotational speed can also be used. By way of example, a rotational speed limit can be established.

It should also be noted that preferably the combined efforts of the individual features in accordance with the invention can be used in every arbitrary combination. In particular the combinations of features disclosed in the independent claims of which one or more characteristics have been omitted also are preferred.

It should be noted that the linkages of features expressed as "or" denote on one hand the mathematical "or" and on the other hand the "or" which excludes the other possibility.

It should further be noted that the concepts of control and their derivative concepts are to be construed widely in the sense of the invention. It also includes especially regulation and/or control in the sense of the DIN.

It will be apparent to those skilled in the art that from the herein-described embodiments of the invention numerous further modifications and embodiments are conceivable that are included within the invention. The invention is particularly not restricted to the embodiments described herein.

In the following, the invention will now be further explained on the basis of an exemplary, non-restricting embodiment.

BRIEF DESCRIPTION OF THE DRAWINGS

There is shown.

DESCRIPTION OF THE PREFERRED EMBODIMENTS

Figure 1:
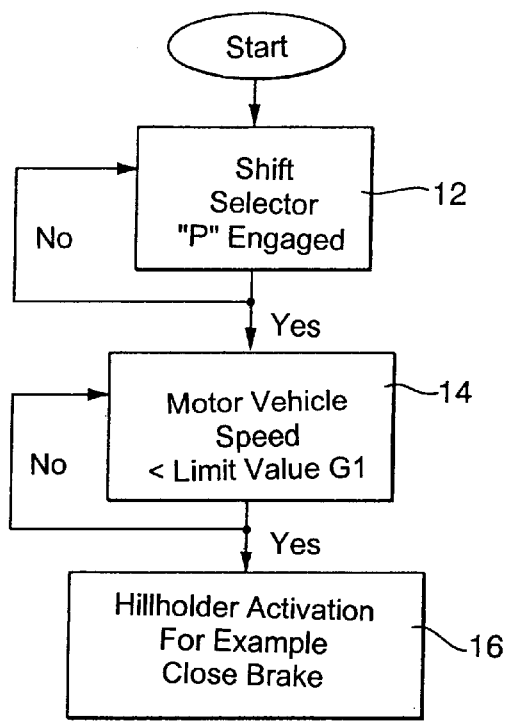
FIG. 1 the steps of a first exemplary method in accordance with the invention.

FIG. 1 shows the course of an exemplary first method in accordance with the invention.

With it step 12 examines whether the transmission shift selector stands at "P" (=park). As long as that is the case, step 14 checks whether the motor vehicle speed is less than a first limit value for the vehicle speed, limit value G1. As long as that is the case, the hill holder is activated in step 16. That follows, by way of example, by closing of the brake. By way of example a brake engagement follows. The possibilities available for that are, for example, brake-by-wire or automating the parking brake.

It should be noted that the vehicle speed can be determined from, for example, rotational speed information that is made available, for example, by the ABS sensors or by tachometer speed.

It should further be noted that the minimum value G1 is for example 3 km/h. Further, it is preferred that the activation of the hill holder is equal to a locking of the service brake.

Figure 2:
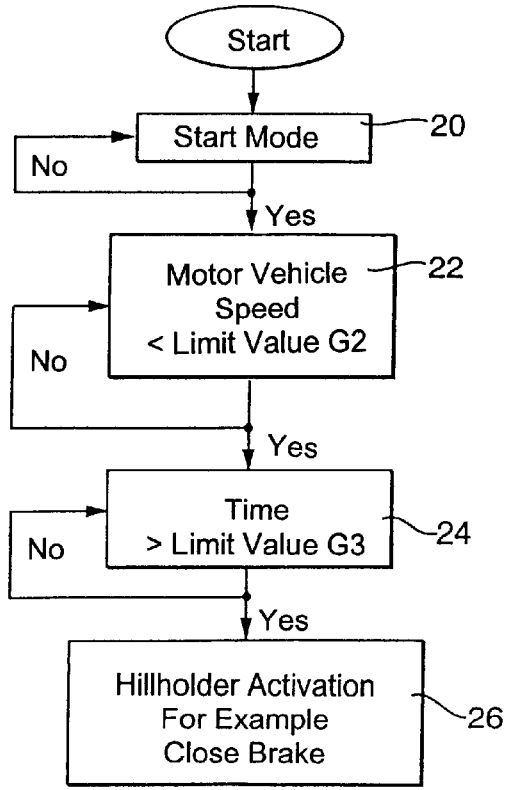
FIG. 2 the steps of a second exemplary method in accordance with the invention.

FIG. 2 shows a second exemplary course of a method in accordance with the invention. Therein whether the motor vehicle is in a starting mode is checked in step 20.

So long as the motor vehicle is in a starting mode, the speed will be checked (step 22). Thereby, whether the vehicle speed is less than a predetermined limit value, value G2, will be checked. The motor vehicle speed can be determined from, for example, the rotational speed information. That information can be made available, for example, by the ABS sensors. It is also preferred that it be obtained from the tachometer speed. The minimum value G2 for the vehicle speed amounts to, for example, 3 km/h. But other predetermined speeds such as, for example, 10 km/h or 9 km/h or 8 km/h or 7 km/h or 6 km/h or 5 km/h or 4 km/h or 2 km/h or 1 km/h also are [also] preferred.

As long as the vehicle speed is less than the limit value G2, there will subsequently be a check in step 24 whether the aforesaid condition lasts longer than a predetermined time period, limit value G3. The predetermined time period G3 amounts to, for example, 20 or 15 or 12 or 10 or 8 or 5 or 3 or 2 or 1 second(s).

As long as the condition lasts longer than the predetermined time period G3, the hill holder will subsequently be activated.

It should be noted that instead of a time control, or supplementary to a time control, a control of a measured and/or a calculated temperature is also possible such as, for example, clutch temperature.

By way of example, the hill holder can be activated when the clutch temperature is above a predetermined clutch temperature G4. The clutch temperature is preferably measured at a predetermined position.

By way of example, the limit value G4 for the clutch temperature is 300° C., whereby that 300° C. lies at a position 4 mm below the lining surface of the clutch. It is also preferred that control of the power loss in the clutch be considered. It is preferred, by way of example, that the hill holder is activated when a predetermined power loss is longer than a pre-defined time interval.

It is also preferred that the control be undertaken based upon the power loss and/or the temperature instead of or supplementary to the time control.

Figure 3:
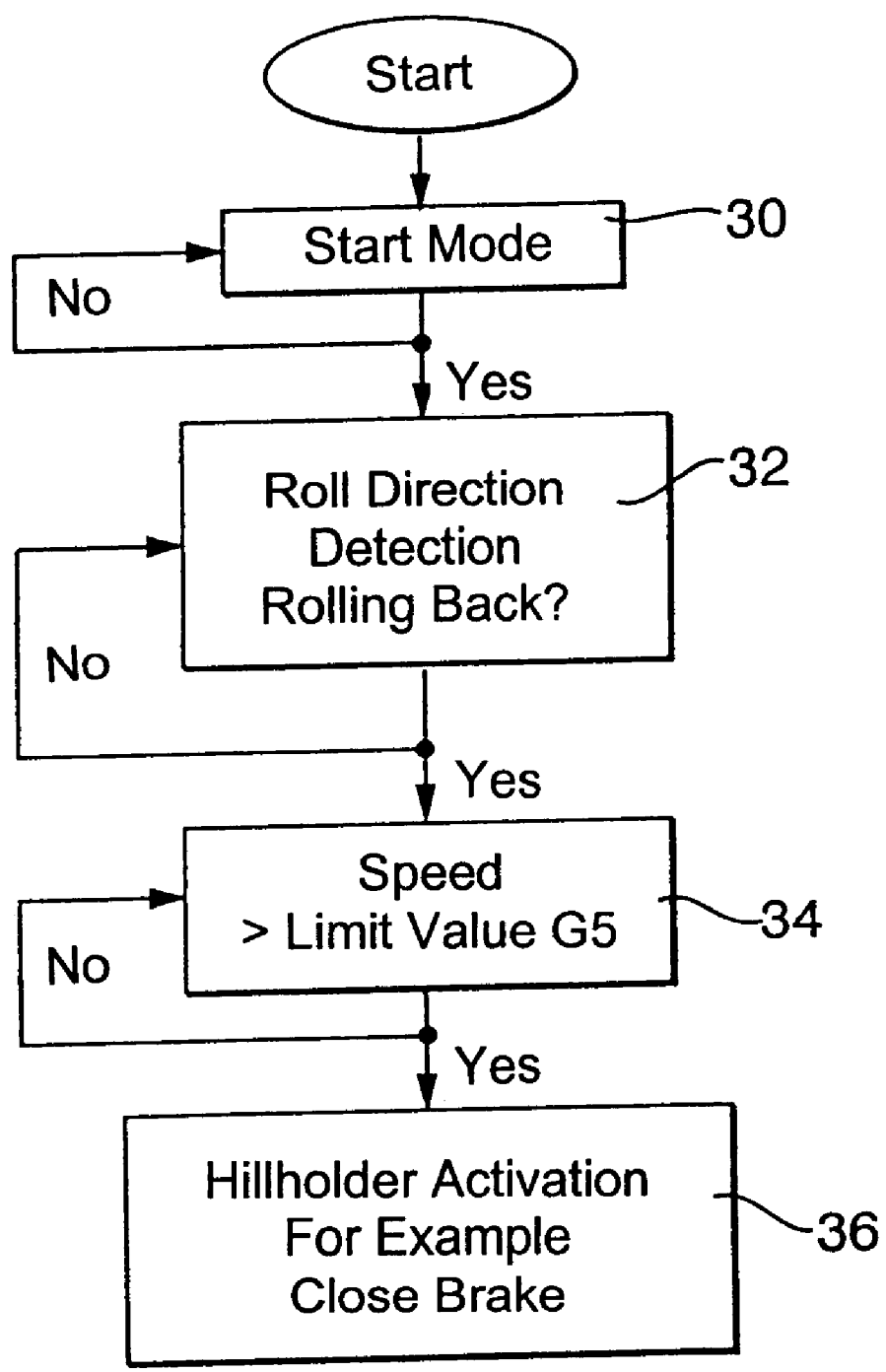
FIG. 3 the steps of a third exemplary method in accordance with the invention.

FIG. 3 shows a third exemplary course of a method in accordance with the invention.

In accordance with that exemplary embodiment step 30 checks whether the motor vehicle is in a starting mode. As long as that is the case, subsequently in step 32 the rolling direction of the motor vehicle is checked. Basically, each person skilled in that art will hereby know strategies that can be utilized to recognize whether a motor vehicle is rolling backward.

As long as backward rolling is determined, it will subsequently be checked whether the speed of the motor vehicle is greater than a predetermined speed limit G5 (step 34).

As long as that is the case, the hill holder will be activated in step 36. Thereby, for example, further motor vehicle movement will be prevented through a clutch engagement and/or other hill holder operation.

It is also preferred that the engagement of the hill holder is associated with further conditions. For example, the hill holder is engaged when the motor vehicle rolls back a predetermined distance. As an example, the wheel circumference and the rotation can be used to ascertain the distance (for example, one wheel revolution).

It is also preferred that the hill holder only engages when a predetermined backward rolling speed G5 exists, for example 3 km/h. Besides, it can be pointed out that the speed check, that is, the check whether the speed is greater than the value G5, can also be dispensed with.

The invention furthermore provides an apparatus for an automatic clutch and/or an automatic transmission. Those devices have actuation units and a control unit, such as an electronic control unit with a computer unit and a data storage device.

In the hill holder arrangement there likewise exists an actuation arrangement that, for example, can be integrated into the control unit of an automatic clutch or the transmission control of an automatic transmission or a continuously variable transmission (CVT). In that way, if necessary, the structural space can be better utilized; and shorter paths between control devices can be used. The likelihood of losses at interfaces is thereby reduced.

Likewise, the electronic controls, with or without the power units for the actuation units, can also be constructed in a separate control unit. That produces an advantageous condition when the structural space situation is such that two small sub-units are needed, in which those can be better accommodated in an indented structural space.

By way of example, a hill holder unit can be an automatically actuated brake.

That brake can be actuated, for example, in a situation where the motor vehicle is standing, the engine is off, and the clutch is disengaged, so that the motor vehicle does not roll away in the case the ground is not level.

Likewise, it can be automatically actuated when during a motor start attempt the clutch is opened by means of an actuating element or the transmission is in the neutral region. That leads to increased safety so that during motor starting there exists no torque-transmitting connection between the engine and the wheels, and therewith the hill holder unit can prevent rolling away. The automatically actuated brake can also be operated to provide assistance during a starting process, in which during starting on a slope rolling in the opposite direction is avoided or reduced.

Moreover, it is appropriate for the hill holder to be actuated when, for instance, it is necessary to be stationary for a procedure of the automatic clutch such as, for instance, a calibration or adaptation of a quantity, such as the engagement point.

While controlling automatic clutches or automatic transmissions in accordance with the invention, inclines in the roadway can be detected with the help of signals. While starting the motor vehicle on an incline the recognition can only be accomplished after a known time. In that case, when the foot or hand brake are not employed, that leads to a short rearward rolling of the motor vehicle.

In motor vehicles in accordance with the invention with automatic parking brakes, that, for example, are actuated by a drive unit that can for example be steplessly actuated, such as an electric motor, such a parking brake can be controlled in such a manner that starting of the motor vehicle only through the actuation of the accelerator follows and rearward rolling is avoided. That will be achieved, for example, that the motor vehicle brake, such as a parking brake or a service brake, is automatically closed when the motor vehicle is standing without the transmission gear being engaged. If the accelerator is thereafter actuated, and an increased drive power of the engine is set, the clutch will be engaged to assure the starting procedure, and at the same time or for a delay period the brake can be opened. In that connection, it is advantageous for the torque to cause a forward thrust of the motor vehicle to be greater than the remaining slope drive-off momentum.

For the driving situation of starting a motor vehicle on an ascending roadway, the control of the automatic clutch and the automatic brake (hill holder) recognizes that driving situation, for instance upon backward rolling of the motor vehicle as a result of not actuating the foot brake and correspondingly delayed actuation of the, accelerator pedal. During the normal temporary displacement, by this ending of the foot brake activation and the accelerator activation an insignificant rolling of the motor vehicle is at least possible. That can be recognized. This situation of the starting or standing on an incline can also be assessed by a rapid activation of the foot brake on the part of the driver shortly after beginning a start. That follows then, for example, when between the two brake activations there is an accelerator activation and a predetermined time threshold is not exceeded.

Furthermore, the existence of an incline of the roadway can be identified, for example, when the actual place of the motor vehicle is identified with a navigation system and to the actual position of the motor vehicle relative to the roadway profile a notation exists with regard to the incline/the descent. Consequently, whether a rising roadway or a descending roadway exists can be identified on the basis of the indication of information from a navigation system.

In a recognized situation of a present start up a hill, the parking brake can be controlled in such a way as to be tightly applied or closed so that a rearward movement of the motor vehicle is securely prevented, without, however, the clutch building up a transferable torque, by which the motor vehicle [is stopped] would be held on the hill by means of clutch activation. By accelerator activation and corresponding commencement of a starting procedure of a motor vehicle, the clutch will be correspondingly so far open that the motor vehicle does not start to move. When the transferable torque of the clutch becomes increasingly large, the parking brake will automatically be opened, so that from the sum of the driving force and the stopping force, against the downward force of the slope, the motor vehicle does not begin to roll.

Figure 4:
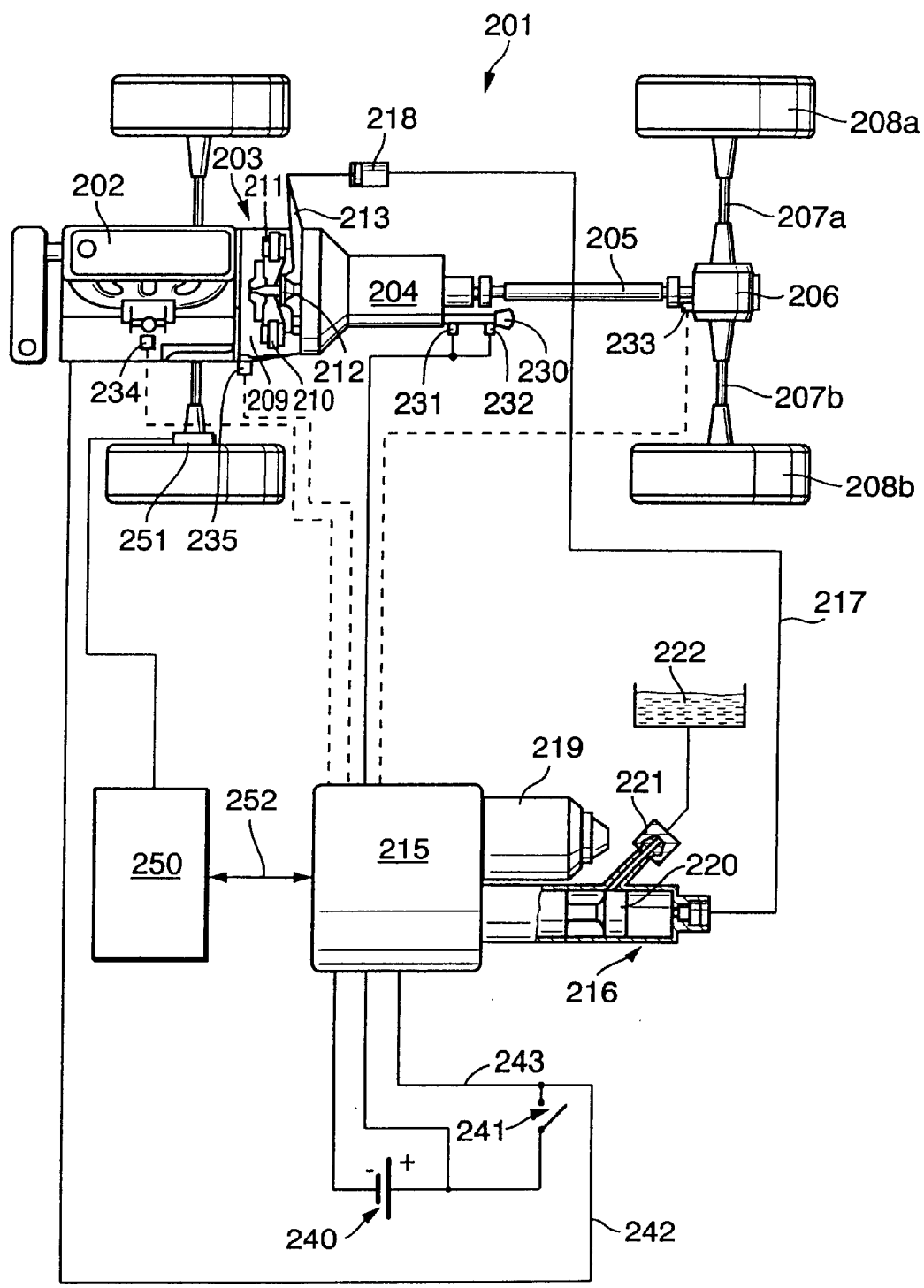
FIG. 4 a schematic representation of a motor vehicle that includes a hill holder in accordance with the invention, and FIG. 5 another schematic representation of a motor vehicle.

FIG. 4 shows a motor vehicle 201 with a drive unit 202, such as an internal combustion engine or a hybrid drive arrangement with an internal combustion engine and an electric motor, with a torque transmitting system such as clutch 203 and a transmission 204, wherein the transmission has arranged behind it a drive shaft 205, which drives two drive shafts 207*a* and 207*b* by means of a differential 206, which further drive the driven wheels 208*a* and 208*b*. The torque transmitting system constitutes a friction clutch 203 with a flywheel 209, a pressure plate 210, a clutch disk 211, a release bearing 212, and a clutch fork 213, whereby the clutch fork is operated by means of an actuator 215 with a master cylinder 216, a pressure communicator, such as a hydraulic conduit 217 and a slave cylinder 218. The actuator is represented as a pressure-medium-actuated actuator, which has an electric motor 219 that operates the master cylinder piston 220 through a gear so that the pressure conduit 217 and the slave cylinder 218 can engage and disengage the torque-transmitting system. Furthermore, the actuator 215 includes the electronics for actuating and controlling the actuator, that is, the power electronics as well as the control electronics. The actuator is provided with a venting bore 221, which is connected with a reservoir 222 for the pressure medium.

The motor vehicle 201 with the transmission 204 has a gear shift lever 230 on which are arranged a gear recognition sensor 231 and a shift intention sensor 232, which detects a shift intention of the driver on the basis of movement of the shift lever, that is, on the basis of the applied force. Furthermore, the motor vehicle is furnished with a rotational speed sensor 233, which detects the rotational speed of the transmission output shaft or the wheel rotational speed. Furthermore, there is provided a throttle valve sensor 234, which detects the throttle valve position, and a rotational speed sensor 235, which detects the engine rotational speed.

The gear recognition sensor detects the position of internal transmission shift elements or the gears in the transmission that are engaged, so that by means of the signal at least the applied gear position is registered in a control unit. Furthermore, the movement of the internal transmission shift elements can be detected by an analog sensor, so that an early recognition of the next applied gear can be performed.

The actuator 215 is powered by a battery 240. Moreover the apparatus provides as a rule a multi-position ignition switch 241, which as a rule is actuated by the ignition key, whereby the starter of the internal combustion engine 202 is engaged over the conduit 242. A signal is further transmitted over the conductor 243 to the electronic unit of the actuator 215, after which the actuator is activated by, for example, switching on the ignition.

FIG. 4 shows the hill holder in block 250, which cooperates at least with a motor vehicle brake 251, and the latter is at least temporarily automatically operated. For that purpose hill holder 250 includes an electronic control unit and brake 251 has an actuation unit. The hill holder 250 is in signal communication 252 with the control unit of the automatic clutch.

Figure 5:
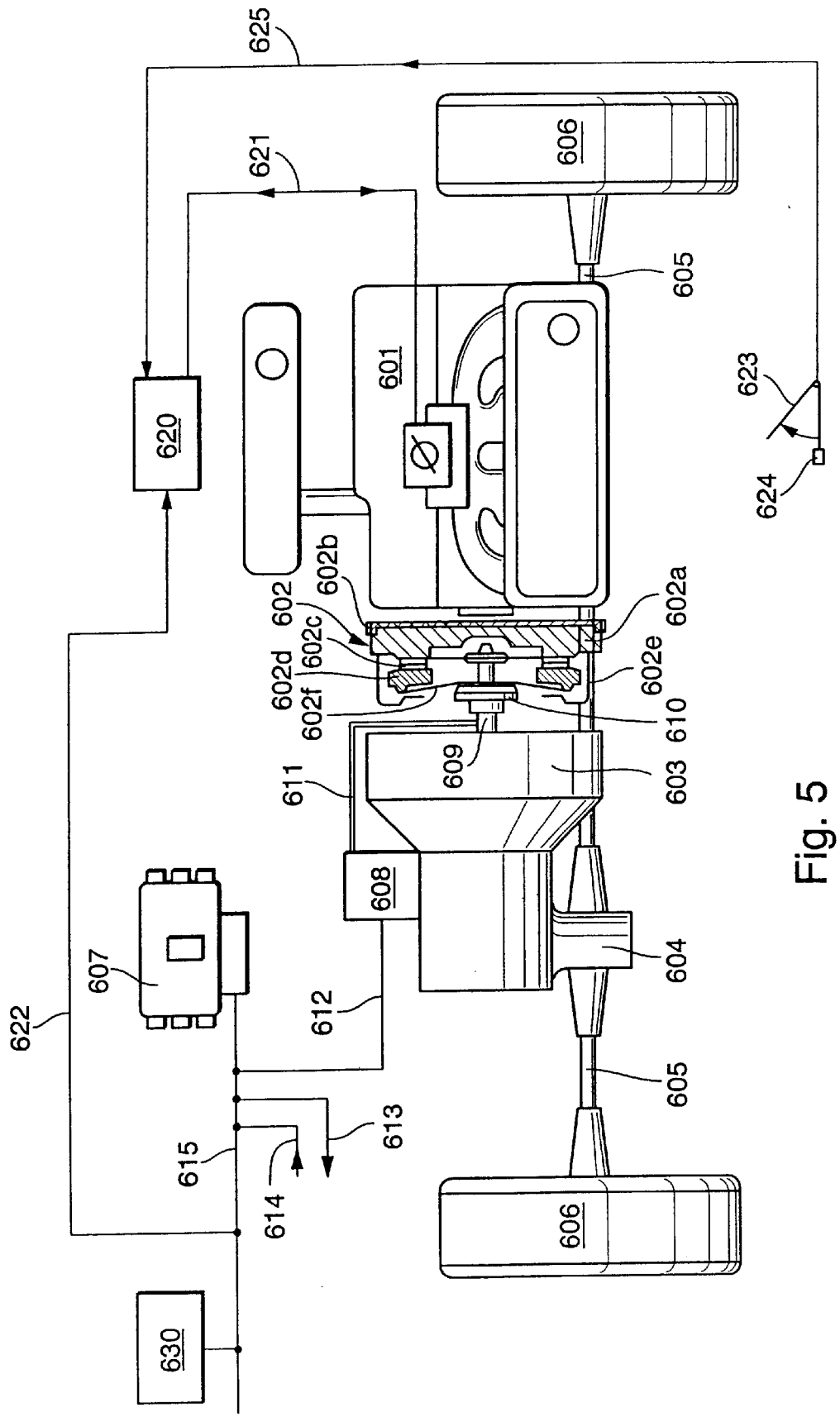

FIG. 5 shows a schematic representation of a drive train of a motor vehicle with a drive unit 601, such as an internal combustion engine or a motor, a torque transmission system 602, such as, for example, a friction clutch, a dry friction clutch or a wet-running friction clutch, a transmission 603 as well as a differential 604, output shafts 605, and wheels 606 driven by the output shafts. Rotational speed sensors (not shown) can be arranged on the wheels 606 to detect the rotational speed of the wheels. The rotational speed sensors can also be part of other functional electronic units, such as, for example, an anti-lock brake system (ABS). The drive unit 601 can also be arranged as a hybrid drive with, for example, an electric motor, a free-wheeling flywheel, and an internal combustion engine.

The torque transmission system 602 is arranged as a friction clutch, whereby the torque transmission system can also be arranged, for example, as a magnetic particle coupling, a plate clutch, or a torque converter with a converter lockup clutch, or another clutch. Furthermore, FIG. 5 shows a control unit 607 and a schematically-shown actuator 608. The friction clutch can also be constructed as a wear-regulated, self-adjusting clutch.

The torque transmission system 602 is mounted on a flywheel 602a or is connected with it, whereby the flywheel can be a divided flywheel with a primary mass and a secondary mass, with a damper unit between the primary mass and the secondary mass, and on which a starter ring gear 602b is arranged. The torque transmission system has collectively a clutch disk 602c with friction linings and a pressure plate 602d, as well as a clutch cover 602e and a plate spring 602f. The self-adjusting clutch has, in addition, means which allow regulation and wear adjustment, whereby a sensor, such as a force or direction sensor is present, which detects a situation in which an adjustment is necessary and by which detection also is carried out.

The torque transmission system is operated by a disengagement device 609 such as, for example, a pressure-medium-operated, such as hydraulic, central disengagement device, whereby the disengagement device can carry a release bearing 610, and by means of admission the clutch can be engaged and disengaged. The disengagement device can also be formed as a mechanical disengagement device, which operates a release bearing or a comparable element, by impinging or by operation.

The actuator 608, as a working unit, controls the mechanical or hydraulic disengagement device or central disengagement device to engage or disengage the clutch over a mechanical connection or over a pressure communication 611 or a pressure transmission span, such as a hydraulic conduit. The actuator 608, with its at least one output element, or with several output elements, furthermore operates to shift the transmission, whereby, for example, a central selector shaft of the transmission is operated through the output element or the output elements. The actuator therewith operates internal transmission shift elements of the transmission, such as a central selector shaft or shift rods or other shift elements, to engage, disengage, or change the gear stages or transmission ratios.

The actuator 608 can also be arranged as or provided as a shift control actuator, and which is arranged within the transmission. The shift control operates through a driving self-rotation in guiding guided elements, such as shift elements, to shift the gear stages. Furthermore, the actuator for shifting the gear ratios can also contain the actuator for operating the torque transmission system, whereby in that case an operating connection to the clutch release device is necessary.

The control unit 607 is connected with the actuator by the signal line 612, so that control signals and/or sensor signals or operating condition signals can be exchanged, transmitted, or scanned. Furthermore, the signal connections 613 and 614 are available, over which the control unit can be in signal connection with further sensors or electronic units, at least from time to time. Such other electronic units can be, for example, engine electronics, anti-lock braking system electronics, or anti-skid system electronics. Further sensors can be sensors that in general characterize or detect the operating condition of the motor vehicle, such as, for example, rotational speed sensors of the engine or of the wheels, throttle plate position sensors, accelerator position sensors, or other sensors. The signal connection 615 provides a connection with a data bus, such as, for example, a CAN bus, over which system data concerning the motor vehicle or other electronic units can be provided to be available, because the electronic units as a rule are linked together by computer units.

An automatic transmission can in that way be shifted or a gear change can be practiced that is initiated by the driver of the motor vehicle, in which through, for example, a switch he gives a signal to upshift or downshift. Furthermore, by means of an electronic shift lever a signal can be provided to be available in which gear the transmission is to be shifted. By means of, for example, characteristic values, characteristic curves, or characteristic fields and on the basis of sensor signals by known, predetermined points an automatic transmission can also carry out a gear change independently, without the need for the driver to bring about a gear change.

The motor vehicle is preferably equipped with an electronic accelerator pedal 623 or load lever, whereby the accelerator pedal 623 triggers a sensor 624 by means of which the engine electronics 620 controls or regulates, for example, the fuel supply, moment of ignition, injection time, or throttle-valve position over the signal conduit 621 of engine 601. The electronic accelerator pedal 623 with sensor 624 is connected over signal conduit 625 with the engine electronics 620. The engine electronics 620 is connected over signal conduit 622 with the control unit 607. Moreover, a transmission control electronics 630 can also be connected with the units 607 and 620. A throttle-valve control having an electric motor is appropriate therefor, whereby the position of the throttle valve is controlled by the engine electronics. In such systems a direct mechanical connection to the accelerator pedal is no longer necessary or appropriate.

For determining or calculating, for example, a transmission temperature, such as, for example, a transmission fluid temperature or a temperature of a transmission element, the typical friction loss of transmission parts and/or input rotational speed and/or output rotational speed of the transmission can be drawn upon. Furthermore, the fluid volumes and the fluid flows can be taken into account. Moreover, other above-identified values can be taken into account in the calculation. The transmission temperature determination, however, must not be limited to the slowing-down time; on the contrary, it can also be carried out in other operating situations.

The power applied to a control unit of an automatic transmission and/or of an automatic torque transmission system can be maintained, for example, in order to carry on with specific operational functions after vehicle operation, such as, for example, if, during temperature determination or temperature calculation [for example] by means of temperature models a critical condition is detected, such as, for example, the clutch, the transmission, or the synchronization unit, or if for example adaptations are active or data are being ascertained or stored, such as, for example storing data or adapted values in an EEPROM. Further feasible adaptations of system values from an electric motor, a transmission, or a pressure-medium system, such as a hydraulic system, can be carried out. Likewise, adjustments in the transmission or in the clutch (for example, during activation of a motor vehicle stopping unit) can be required or necessary to determine frictional forces (sliding or static friction forces or friction values) and characteristic quantities for the actuator (for example motor parameters such as armature resistance or time constants for the electric motor). Furthermore, hydraulic values or other values, such as characteristic curves of valves or other values can be balanced.

The invention relates to a motor vehicle with at least one hill holder unit to prevent undesired movement of the motor vehicle, whereby the motor vehicle has at least one electronically-controlled clutch unit to control the clutch operation, and/or whereby the transmission apparatus has at least one automatic transmission, as well as a method for operating a motor vehicle.

The claims included in the application are exemplary and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for preventing unintended rolling movement of a motor vehicle, said method comprising the steps of:
   a. sensing whether a drive train of the vehicle is in a non-torque-transmitting mode whereby torque cannot be transmitted between an engine of the vehicle and at least one drive wheel of the vehicle to cause a transfer of power from the engine to the at least one drive wheel, wherein the drive train includes a manually-shiftable transmission and the drive train mode sensing step includes the step of sensing whether the manually-shiftable transmission is in a neutral position;
   b. sensing whether speed of movement of the vehicle is less than a predetermined limit speed value;
   c. engaging a vehicle braking system to prevent rolling movement of the vehicle when the drive train is in a non-torgue-transmitting mode and the speed of movement of the vehicle is less than the predetermined limit speed value.

2. A method in accordance with claim 1, wherein the drive train includes a clutch and the drive train mode sensing step includes the step of sensing whether the clutch is in a disengaged position.

3. A method in accordance with claim 1, wherein the vehicle speed sensing step includes the step of sensing a rotational speed within the vehicle drive train.

4. A method in accordance with claim 3, wherein the vehicle speed sensing step includes the step of sensing rotation of a vehicle driving wheel.

5. A method in accordance with claim 3, wherein the vehicle speed sensing step includes the step of sensing rotation of a transmission output shaft.

6. A method in accordance with claim 1, wherein the vehicle braking system is a service brake system.

7. A method for preventing unintended rolling movement of a motor vehicle, said method comprising the steps of:
   a. sensing whether a drive train of the vehicle is in a non-torque-transmitting mode whereby torque cannot be transmitted between an engine of the vehicle and at least one drive wheel of the vehicle to cause a transfer of power from the engine to the at least one drive wheel, wherein the drive train includes an automatic transmission and the drive train mode sensing step includes the step of sensing whether the automatic transmission is in a park mode;

b. sensing whether speed of movement of the vehicle is less than a predetermined limit speed value;

c. engaging a vehicle braking system to prevent rolling movement of the vehicle when the drive train is in a non-torque-transmitting mode and the speed of movement of the vehicle is less than the predetermined limit speed value.

8. A method in accordance with claim 7, wherein the drive train mode sensing step includes the step of sensing a transmission shift lever position.

9. A method in accordance with claim 7, wherein the vehicle speed sensing step includes the step of sensing a rotational speed within the vehicle drive train.

10. A method in accordance with claim 9, wherein the vehicle speed sensing step includes the step of sensing rotation of a vehicle driving wheel.

11. A method in accordance with claim 9, wherein the vehicle speed sensing step includes the step of sensing rotation of a transmission output shaft.

12. A method in accordance with claim 7, wherein the vehicle braking system is a parking brake system.

13. A method in accordance with claim 7, wherein the vehicle braking system is a service brake system.

14. A method in accordance with claim 7, wherein the sensing step includes sensing whether the vehicle is in a starting mode, and the steps of determining whether the vehicle is in a starting mode longer than a predetermined limit time and wherein the step of engaging the braking system is effected when the vehicle has been in the starting mode longer than the predetermined time.

15. A method in accordance with claim 14, wherein the predetermined limit speed is 3 km/h.

16. A method in accordance with claim 14, wherein the vehicle speed sensing step includes the step of sensing a rotational speed within the vehicle drive train.

17. A method in accordance with claim 14, wherein the vehicle speed sensing step includes the step of sensing rotation of a vehicle driving wheel.

18. A method in accordance with claim 14, wherein the vehicle speed sensing step includes the step of sensing rotation of a transmission output shaft.

19. A method in accordance with claim 14, wherein the vehicle braking system is a parking brake system.

20. A method in accordance with claim 14, wherein the vehicle braking system is a service brake system.

21. A method in accordance with claim 14, including the steps of sensing a fuel supply member position, and disengaging the engaged vehicle braking system when the fuel supply member position is greater than a predetermined fuel supply member limit position.

22. A method in accordance with claim 21, wherein the fuel supply member position is sensed by a throttle valve sensor.

23. A method in accordance with claim 21, wherein the fuel supply member position is sensed by an accelerator pedal position sensor.

24. A method in accordance with claim 7, including the step of sensing a temperature associated with the vehicle, and wherein the step of engaging the braking system is effected when the sensed temperature is greater than a predetermined temperature.

25. A method in accordance with claim 24, wherein the temperature sensing step includes sensing the temperature of a clutch positioned within a drive train of the vehicle.

26. A method in accordance with claim 25, wherein the sensed temperature is a clutch lining temperature.

27. A method in accordance with claim 26, wherein the predetermined temperature is greater than about 300° C.

28. A method in accordance with claim 24, wherein the vehicle speed sensing step includes the step of sensing a rotational speed within the vehicle drive train.

29. A method in accordance with claim 24, wherein the vehicle speed sensing step includes the step of sensing rotation of a vehicle driving wheel.

30. A method in accordance with claim 24, wherein the vehicle speed sensing step includes the step of sensing rotation of a transmission output shaft.

31. A method in accordance with claim 24, wherein the vehicle braking system is a parking brake system.

32. A method in accordance with claim 24, wherein the vehicle braking system is a service brake system.

33. A method in accordance with claim 24, including the steps of sensing a fuel supply member position, and disengaging the engaged vehicle braking system when the fuel supply member position is greater than a predetermined fuel supply member limit position.

34. A method in accordance with claim 33, wherein the fuel supply member position is sensed by a throttle valve sensor.

35. A method in accordance with claim 33, wherein the fuel supply member position is sensed by an accelerator pedal position sensor.

36. A method in accordance with claim 7, including the step of sensing whether the motor vehicle is moving in a backward direction; and wherein the step of engaging the vehicle braking system is effected when the automatic transmission is not in a park mode and the vehicle is moving in a backward direction.

37. A method in accordance with claim 36, including the step of sensing the vehicle backward movement speed, and engaging the vehicle braking system when the motor vehicle is moving backward at a speed greater than a predetermined backward movement limit speed.

38. A method in accordance with claim 37, wherein the predetermined backward movement limit speed is about 3 km/h.

39. A method in accordance with claim 36, including the step of sensing vehicle backward movement distance, and engaging the vehicle braking system when the motor vehicle has moved backward a distance greater than a predetermined backward movement distance limit.

40. A method in accordance with claim 37, wherein the vehicle speed sensing step includes the step of sensing a rotational speed within the vehicle drive train.

41. A method in accordance with claim 37, wherein the vehicle speed sensing step includes the step of sensing rotation of a vehicle driving wheel.

42. A method in accordance with claim 37, wherein the vehicle speed sensing step includes the step of sensing rotation of a transmission output shaft.

43. A method in accordance with claim 36, wherein the vehicle braking system is a parking brake system.

44. A method in accordance with claim 36, wherein the vehicle braking system is a service brake system.

45. A method in accordance with claim 36, including the steps of sensing a fuel supply member position, and disengaging the engaged vehicle braking system when the fuel supply member position is greater than a predetermined fuel supply member limit position.

46. A method in accordance with claim 45, wherein the fuel supply member position is sensed by a throttle valve sensor.

47. A method in accordance with claim 45, wherein the fuel supply member position is sensed by an accelerator pedal position sensor.

48. A method for preventing unintended rolling movement of a motor vehicle, said method comprising the steps of:
   a. sensing whether a drive train of the vehicle is in a non-torque-transmitting mode whereby torque cannot be transmitted between an engine of the vehicle and at least one drive wheel of the vehicle to cause a transfer of power from the engine to the at least one drive wheel;
   b. sensing whether speed of movement of the vehicle is less than a predetermined limit speed value;
   c. engaging a vehicle braking system to prevent rolling movement of the vehicle when the drive train is in a non-torque-transmitting mode and the speed of movement of the vehicle is less than the predetermined limit speed value, wherein the vehicle braking system is a parking brake system.

49. Apparatus for preventing unintended rolling movement of a motor vehicle that includes a drive train for selectively interconnecting an engine with at least one drive wheel, said apparatus comprising:
   a. a sensor for sensing whether the drive train is in a non-torque-transmitting mode whereby torque cannot be transmitted between the engine and the at least one drive wheel to cause a transfer of power from the engine to the at least one drive wheel, wherein the drive train includes a manually-shiftable transmission and means sensing whether the manually-shiftable transmission is in a neutral position;
   b. a sensor for sensing whether the vehicle is moving at a speed that is less than a predetermined limit speed value;
   c. a control system responsive to signals from the vehicle drive train sensor and the vehicle speed sensor for engaging a vehicle braking system to prevent rolling movement of the vehicle when the drive train is in a non-torque-transmitting mode and the speed of movement of the vehicle is less than the predetermined limit speed value.

50. Apparatus in accordance with claim 49, wherein the drive train includes a clutch and means for sensing whether the clutch is in a disengaged position.

51. Apparatus in accordance with claim 49, including vehicle speed sensing means for sensing a rotational speed within the vehicle drive train.

52. Apparatus in accordance with claim 51, wherein the vehicle speed sensing means senses rotation of a vehicle driving wheel.

53. Apparatus in accordance with claim 51, wherein the vehicle speed sensing means senses rotation of a transmission output shaft.

54. Apparatus in accordance with claim 49, wherein the vehicle braking system is a parking brake system.

55. Apparatus in accordance with claim 49, wherein the vehicle braking system is a service brake system.

56. A method in accordance with claim 1, wherein the sensing step includes sensing whether the vehicle is in a starting mode, and the steps of determining whether the vehicle is in a starting mode longer than a predetermined limit time and wherein the step of engaging the braking system is effected when the vehicle has been in the starting mode longer than the predetermined time.

57. A method in accordance with claim 56, wherein the predetermined limit speed is 3 km/h.

58. A method in accordance with claim 56, wherein the vehicle speed sensing step includes the step of sensing a rotational speed within the vehicle drive train.

59. A method in accordance with claim 56, wherein the vehicle speed sensing step includes the step of sensing rotation of a vehicle driving wheel.

60. A method in accordance with claim 56, wherein the vehicle speed sensing step includes the step of sensing rotation of a transmission output shaft.

61. A method in accordance with claim 56, wherein the vehicle braking system is a parking brake system.

62. A method in accordance with claim 56, wherein the vehicle braking system is a service brake system.

63. A method in accordance with claim 56, including the steps of sensing a fuel supply member position, and disengaging the engaged vehicle braking system when the fuel supply member position is greater than a predetermined fuel supply member limit position.

64. A method in accordance with claim 63, wherein the fuel supply member position is sensed by a throttle valve sensor.

65. A method in accordance with claim 63, wherein the fuel supply member position is sensed by an accelerator pedal position sensor.

66. A method in accordance with claim 1, including the step of sensing a temperature associated with the vehicle, and wherein the step of engaging the braking system is effected when the sensed temperature is greater than a predetermined temperature.

67. A method in accordance with claim 66, wherein the temperature sensing step includes sensing the temperature of a clutch positioned within a drive train of the vehicle.

68. A method in accordance with claim 67, wherein the sensed temperature is a clutch lining temperature.

69. A method in accordance with claim 68, wherein the predetermined temperature is greater than about 300° C.

70. A method in accordance with claim 66, wherein the vehicle speed sensing step includes the step of sensing a rotational speed within the vehicle drive train.

71. A method in accordance with claim 66, wherein the vehicle speed sensing step includes the step of sensing rotation of a vehicle driving wheel.

72. A method in accordance with claim 66, wherein the vehicle speed sensing step includes the step of sensing rotation of a transmission output shaft.

73. A method in accordance with claim 66, wherein the vehicle braking system is a parking brake system.

74. A method in accordance with claim 66, wherein the vehicle braking system is a service brake system.

75. A method in accordance with claim 66, including the steps of sensing a fuel supply member position, and disengaging the engaged vehicle braking system when the fuel supply member position is greater than a predetermined fuel supply member limit position.

76. A method in accordance with claim 75, wherein the fuel supply member position is sensed by a throttle valve sensor.

77. A method in accordance with claim 75, wherein the fuel supply member position is sensed by an accelerator pedal position sensor.

78. A method in accordance with claim 1, including the step of sensing whether the motor vehicle is moving in a backward direction; and engaging the vehicle braking system to prevent rolling movement of the vehicle when the motor vehicle is in a starting mode and the vehicle is moving in a backward direction.

79. A method in accordance with claim 78, including the step of sensing the vehicle backward movement speed, and engaging the vehicle braking system when the motor vehicle is in a starting mode and is moving backward at a speed greater than a predetermined backward movement limit speed.

80. A method in accordance with claim 79, wherein the predetermined backward movement limit speed is about 3 km/h.

81. A method in accordance with claim 78, including the step of sensing vehicle backward movement distance, and engaging the vehicle braking system when the motor vehicle has moved backward a distance greater than a predetermined backward movement distance limit.

82. A method in accordance with claim 78, wherein the vehicle speed sensing step includes the step of sensing a rotational speed within the vehicle drive train.

83. A method in accordance with claim 78, wherein the vehicle speed sensing step includes the step of sensing rotation of a vehicle driving wheel.

84. A method in accordance with claim 78, wherein the vehicle speed sensing step includes the step of sensing rotation of a transmission output shaft.

85. A method in accordance with claim 76, wherein the vehicle braking system is a parking brake system.

86. A method in accordance with claim 76, wherein the vehicle braking system is a service brake system.

87. A method in accordance with claim 76, including the steps of sensing a fuel supply member position, and disengaging the engaged vehicle braking system when the fuel supply member position is greater than a predetermined fuel supply member limit position.

88. A method in accordance with claim 87, wherein the fuel supply member position is sensed by a throttle valve sensor.

89. A method in accordance with claim 87, wherein the fuel supply member position is sensed by an accelerator pedal position sensor.

90. Apparatus for preventing unintended rolling movement of a motor vehicle that includes a drive train for selectively interconnecting an engine with at least one drive wheel, said apparatus comprising:
   a. a sensor for sensing whether the vehicle is in a starting mode;
   b. a sensor for sensing whether the vehicle is moving at a speed lower than a predetermined limit speed;
   c. a timer for determining whether the vehicle is in the starting mode longer than a predetermined limit time;
   d. a control system responsive to signals from the vehicle starting mode sensor and the vehicle speed sensor and the starting mode timer for engaging a vehicle braking system to prevent rolling movement of the vehicle when the vehicle is in a starting mode for a time greater than the predetermined starting mode limit time and the speed of movement of the vehicle is less than the predetermined limit speed value; and
   e. wherein the drive train includes a manually-shiftable transmission and means sensing whether the manually-shiftable transmission is in a neutral position.

91. Apparatus for preventing unintended rolling movement of a motor vehicle that includes a drive train for selectively interconnecting an engine with at least one drive wheel, said apparatus comprising:
   a. a sensor for sensing whether the motor vehicle is in a starting mode;
   b. a sensor for sensing whether the motor vehicle is moving in a backward direction;
   c. a control system responsive to signals from the vehicle starting mode sensor and the vehicle backward movement direction sensor for engaging a vehicle braking system to prevent rolling movement of the vehicle when the vehicle is in the starting mode and is moving in a backward direction, and
   e. wherein the drive train includes a manually-shiftable transmission and means sensing whether the manually-shiftable transmission is in a neutral position.

92. Apparatus for preventing unintended rolling movement of a motor vehicle that includes a drive train for selectively interconnecting an engine with at least one drive wheel, said apparatus comprising:
   a. a sensor for sensing whether the drive train is in a non-torque-transmitting mode whereby torque cannot be transmitted between the engine and the at least one drive wheel to cause a transfer of power from the engine to the at least one drive wheel, wherein the drive train includes an automatic transmission and means sensing whether the automatic transmission is in a park mode;
   b. a sensor for sensing whether the vehicle is moving at a speed that is less than a predetermined limit speed value;
   c. a control system responsive to signals from the vehicle drive train sensor and the vehicle speed sensor for engaging a vehicle braking system to prevent rolling movement of the vehicle when the drive train is in a non-torque-transmitting mode and the speed of movement of the vehicle is less than the predetermined limit speed value.

* * * * *